264-50 SR
F520D XR T 866,017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 702

752,701

USE OF IN-LINE MIXER TO UNIFORMLY DISPERSE BUBBLES THROUGHOUT MOLTEN POLYESTER PREPOLYMER

Richard E. Tardif, Pittsford, N.Y. (1669 Lake Ave., Rochester, N.Y. 14650); and John W. Fitzgerald, 343 State St.; and Roy A. Le Blanc, 1669 Lake Ave., both of Rochester, N.Y. 14650

Filed Aug. 14, 1968. Published Sept. 16, 1969
Int. Cl. C08g *53/02*
U.S. Cl. 260—2.5
2 Sheets Drawing. 6 Pages Specification

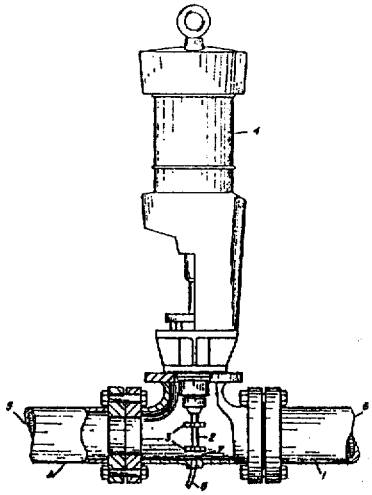

It has been found that by the use of an in-line mixer having the ability to intensely agitate fluid molten relatively low molecular weight polymers such as prepolymeric poly(ethylene terephthalate) shortly after or at about the point where an inert gas is introduced into the molten prepolymer, bubbles of the inert gas can be dispersed uniformly through the prepolymer. After the prepolymer containing the tiny bubbles is solidified, it is easier to grind.

Figure 1:
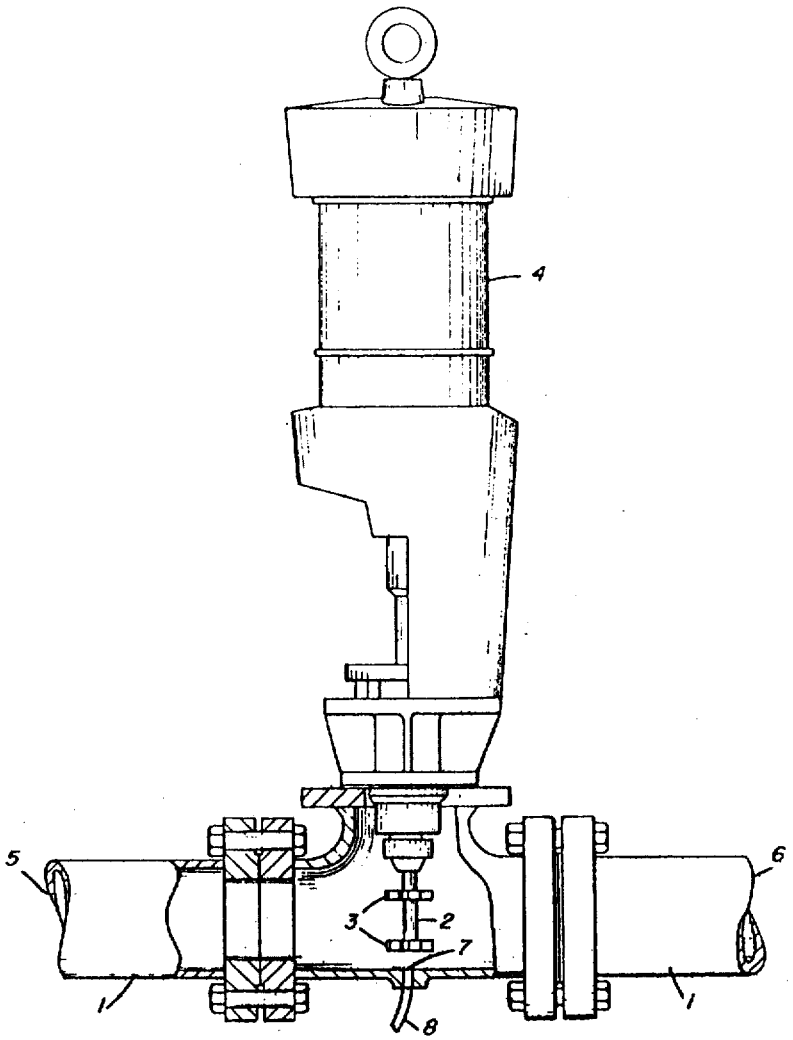
Figure 2:
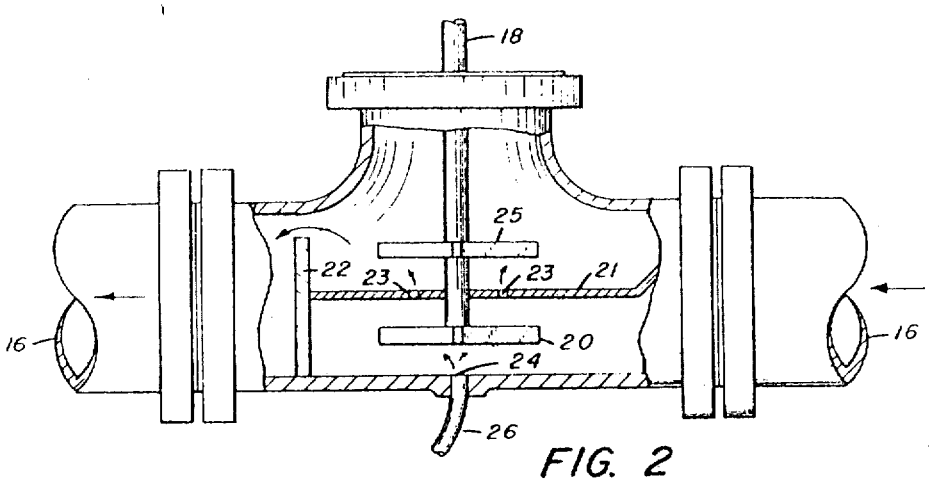
Figure 3:
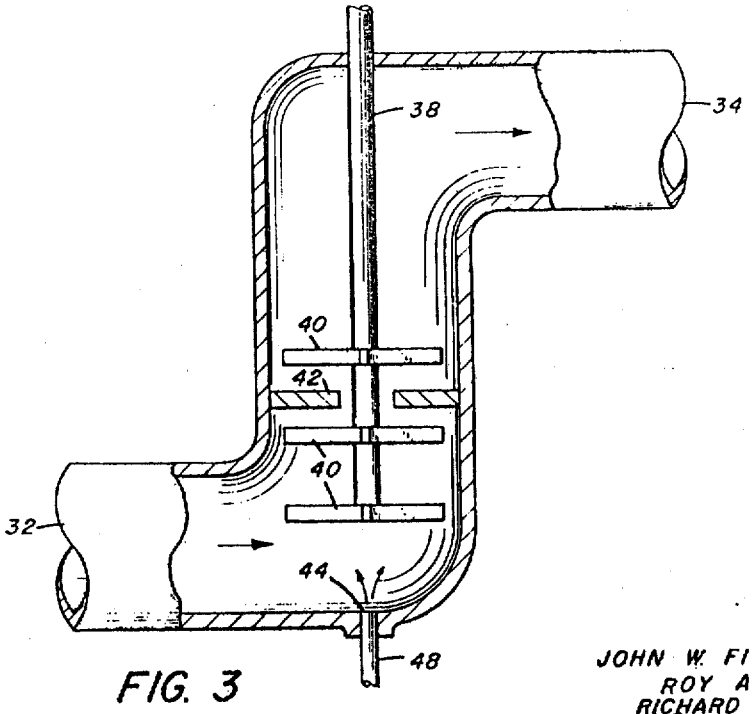

FIGURE 1 denotes one way of carrying out the process. As illustrated, molten prepolymer is directed through conduit 1, which is insulated to keep the prepolymer molten, into close proximity to a means for agitating the prepolymer (blades 3 affixed to shaft 2 which can be driven at high speeds by any conventional means such as motor 4). While the molten prepolymer continues to flow and be agitated, inert gas is injected under pressure through line 8 and orifice 7 into close proximity to the whirling blades 3, whereupon it is quickly dispersed uniformly through the molten prepolymer stream in the form of tiny bubbles. As a final step, the molten prepolymer is conducted quickly away from the agitator and subjected to conditions below its melting point, preferably within about 30 seconds.

264-50 SR

F520D XR T 866,017

T 866,017

752,701

Sept. 16, 1969 R. E. TARDIF ET AL DEF. PUB.

USE OF IN-LINE MIXER TO UNIFORMLY DISPERSE BUBBLES THROUGHOUT MOLTEN POLYESTER PREPOLYMER

Filed Aug. 14, 1968 2 Sheets-Sheet 1

JOHN W. FITZGERALD
ROY A. Le BLANC
RICHARD E. TARDIF
INVENTORS

BY John A. Lewis
Paul V. Holmes

ATTORNEYS 264-50 SR
F520D XR T 866,017

JOHN W. FITZGERALD
ROY A. LeBLANC
RICHARD E. TARDIF
INVENTORS
BY
ATTORNEYS